United States Patent
Ganor et al.

(10) Patent No.: US 10,831,694 B1
(45) Date of Patent: Nov. 10, 2020

(54) MULTI-HOST NETWORK INTERFACE CONTROLLER (NIC) WITH EXTERNAL PERIPHERAL COMPONENT BUS CABLE INCLUDING PLUG TERMINATION MANAGEMENT

(71) Applicant: MELLANOX TECHNOLOGIES, LTD., Yokneam (IL)

(72) Inventors: Avraham Ganor, Shoham (IL); Ashrut Ambastha, Pune (IN); Yael Shenhav, Zichron Yaakov (IL); Samuel Attali, Zichron Yaakov (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 16/446,632

(22) Filed: Jun. 20, 2019

(30) Foreign Application Priority Data

May 6, 2019 (IN) .............................. 201941017979

(51) Int. Cl.
*G06F 13/42* (2006.01)

(52) U.S. Cl.
CPC .. *G06F 13/4221* (2013.01); *G06F 2213/0026* (2013.01)

(58) Field of Classification Search
CPC .................... G06F 13/4221; G06F 2213/0026
See application file for complete search history.

(56) References Cited

U.S. PATENT DOCUMENTS

| | | | |
|---|---|---|---|
| 7,046,668 B2 | 5/2006 | Pettey | |
| 7,103,064 B2 | 9/2006 | Pettey et al. | |
| 7,457,906 B2 | 11/2008 | Pettey et al. | |
| 7,493,416 B2 | 2/2009 | Pettey | |
| 7,620,064 B2 | 11/2009 | Pettey et al. | |
| 7,620,066 B2 | 11/2009 | Pettey et al. | |
| 7,664,909 B2 | 2/2010 | Pettey | |
| 7,706,372 B2 | 4/2010 | Pettey et al. | |
| 7,782,893 B2 | 8/2010 | Pettey et al. | |
| 8,032,659 B2 | 10/2011 | Pettey | |
| 8,346,884 B2 | 1/2013 | Pettey et al. | |
| 8,913,615 B2 | 12/2014 | Pettey et al. | |

(Continued)

OTHER PUBLICATIONS

PCI-express Base 4.0 Specification, pp. 1-700, Sep. 2017.

*Primary Examiner* — Tammara R Peyton
(74) *Attorney, Agent, or Firm* — Kligler & Associates Patent Attorneys Ltd

(57) ABSTRACT

In one embodiment, an external multi-host system includes an external peripheral component bus (PCB) cable terminated with a first and second PCB connector plug, a first network host including a first processor and a first PCB connector receptacle to receive the first PCB connector plug, and a second network host including a second processor and a multi-host network interface card, which includes a network connector receptacle to receive a first network connector plug terminating a network cable, a second PCB connector receptacle to provide connectivity with the first network host and to receive the second PCB connector plug, a first PCB edge-connector to provide connectivity with the second processor, and processing circuitry to operate communication with the first network host over the external PCB cable and with the second processor via the first PCB edge-connector, and exchange network packets between the network hosts and a network.

19 Claims, 6 Drawing Sheets

(56) References Cited

U.S. PATENT DOCUMENTS

| | | |
|---|---|---|
| 9,015,350 B2 | 4/2015 | Pettey |
| 9,106,487 B2 | 8/2015 | Pettey |
| 9,985,820 B2 | 5/2018 | Itkin |
| 9,998,359 B2 | 6/2018 | Itkin et al. |
| 10,148,746 B2 | 12/2018 | Itkin et al. |
| 10,387,358 B2 * | 8/2019 | Oved .................. G06F 13/4278 |
| 2011/0185370 A1 * | 7/2011 | Tamir .................. H04L 41/0803 |
| | | 719/324 |
| 2014/0129741 A1 | 5/2014 | Shahar et al. |

* cited by examiner

MULTI-HOST NETWORK INTERFACE CONTROLLER (NIC) WITH EXTERNAL PERIPHERAL COMPONENT BUS CABLE INCLUDING PLUG TERMINATION MANAGEMENT

FIELD OF THE INVENTION

The present invention relates to computer network equipment, and in particular, but not exclusively to, multi-host network equipment.

BACKGROUND

A compute node mounted in a rack may communicate with a packet communication network using a standard Peripheral Component Interconnect Express (PCIe)® Network Interface Controller (NIC) that is connected to a top of rack (TOR) switch, connecting the rack to the rest of the network. Since the compute node is a stand-alone entity and it is served as such, the compute node includes its own NIC and connects directly to the TOR switch. In some cases, a server enclosure might aggregate several compute nodes into a single unit thus enabling the sharing of certain resources between the nodes. This resource sharing generally includes power, space and thermal control functions.

Peripheral Component Interconnect Express (PCIe) is a computer expansion bus standard, which is used for connecting hosts to peripheral devices such as Network Interface Cards (NICs) and storage devices. PCIe is specified, for example, in the PCI-express Base 4.0 Specification, 2017, which is incorporated herein by reference.

US Patent Publication 2014/0129741 (hereinafter the '741 publication) of Shahar, et al., which is herein incorporated by reference, describes a method including establishing in a peripheral device, at least first and second communication links with respective first and second hosts. The first communication link is presented to the first host as the only communication link with the peripheral device, and the second communication link is presented to the second host as the only communication link with the peripheral device. The first and second hosts are served simultaneously by the peripheral device over the respective first and second communication links.

The '741 publication describes methods and systems for operating a peripheral device by multiple hosts over interfaces such as PCIe. Example peripheral devices may comprise NICs or storage devices. The PCIe interface is by nature a point-to-point, host-to-device interface that does not lend itself to multi-host operation. Nevertheless, the disclosed techniques enable multiple hosts to share the same peripheral device and thus reduce unnecessary hardware duplication.

In some embodiments of the '741 publication, the peripheral device sets-up multiple PCIe links with the respective hosts, but presents each link to the corresponding host as the only existing link to the device. Consequently, each host operates as if it is the only host connected to the peripheral device. On the peripheral device side, the device manages multiple Me sessions with the multiple hosts simultaneously. The multiple PCIe links can also be viewed as a wide PCIe link that is split into multiple thinner links connected to the respective hosts.

Typically, the peripheral device trains and operates the PCIe links separately. For example, the device may transition each link between operational states (e.g., activity/inactivity states and/or power states) independently of the other links. The links are typically assigned different sets of identifiers and configuration parameters by the various hosts, and the device also manages a separate set of credits for each link. Typically, the device negotiates the link parameters separately in each link vis-à-vis the respective host. In some embodiments, however, the device may later use a common link parameter that is within the capabilities of all hosts.

In summary, the '741 publication discloses techniques that enable multiple hosts to share a peripheral device using PCIe in a manner that is said to be transparent to the hosts. Moreover, the multi-host operation is performed without PCIe switching and without a need for software that coordinates among the hosts.

SUMMARY

There is provided in accordance with an embodiment of the present disclosure, an external multi-host system, including an external peripheral component bus cable terminated with a first peripheral component bus connector plug and a second peripheral component bus connector plug, a first network host including a first host processor and a first peripheral component bus connector receptacle configured to reversibly receive the first peripheral component bus connector plug terminating the external peripheral component bus cable, and a second network host including a second host processor and a multi-host network interface card, which includes a network connector receptacle configured to provide connectivity with a packet communication network and to reversibly receive a first network connector plug terminating a network cable, a second peripheral component bus connector receptacle configured to provide connectivity with the first network host and to reversibly receive the second peripheral component bus connector plug terminating the external peripheral component bus cable, a first peripheral component bus edge-connector configured to provide connectivity with the second host processor, and processing circuitry configured to set up and operate communication with the first network host over the external peripheral component bus cable and with the second host processor via the first peripheral component bus edge-connector, and exchange network communication packets between the network hosts and the packet communication network.

Further in accordance with an embodiment of the present disclosure, the system includes a server enclosure enclosing the first and second network hosts, the multi-host interface card and the first peripheral component bus connector receptacle being configured so that the external peripheral component bus cable connects the multi-host interface card of the second network host with the first peripheral component bus connector receptacle of the first network host externally to the server enclosure.

Still further in accordance with an embodiment of the present disclosure the external peripheral component bus cable connects the multi-host interface card of the second network host with the first peripheral component bus connector receptacle of the first network host externally to the server enclosure.

Additionally in accordance with an embodiment of the present disclosure, the system includes a first server enclosure enclosing the first network host, and a second server encloser enclosing the second network host, the multi-host interface card and the first peripheral component bus connector receptacle being configured so that the external peripheral component bus cable connects the multi-host interface card of the second network host with the first peripheral component bus connector receptacle of the first network host externally to the first and second server enclosures.

Moreover, in accordance with an embodiment of the present disclosure the second network host includes a motherboard including the second host processor and a peripheral component bus slot configured to provide connectivity with the first peripheral component bus edge-connector of the multi-host network interface card.

Further in accordance with an embodiment of the present disclosure the first peripheral component bus edge-connector and the peripheral component bus slot are electromechanically connected.

Still further in accordance with an embodiment of the present disclosure the first network host further includes a motherboard including the first host processor and a peripheral component bus slot, and an auxiliary card including the first peripheral component bus connector receptacle and a second peripheral component bus edge-connector, which is configured to provide connectivity with the peripheral component bus slot.

Additionally, in accordance with an embodiment of the present disclosure the second peripheral component bus edge-connector and the peripheral component bus slot are electromechanically connected.

Moreover, in accordance with an embodiment of the present disclosure the auxiliary card includes processing circuitry coupled to the first peripheral component bus connector receptacle and the fourth peripheral component bus edge-connector, the processing circuitry being configured to retime signals being transferred between the first peripheral component bus connector receptacle and the second peripheral component bus edge-connector.

Further in accordance with an embodiment of the present disclosure, the system includes a rack in which the first and second network hosts are mounted, a network switch device, and the network cable, wherein the first network connector plug terminating the network cable is inserted into the network connector receptacle of the multi-host network interface card, the network cable including a second network connector plug inserted into the network switch device.

Still further in accordance with an embodiment of the present disclosure the first network host or the second network host includes any one or more of the following a computer processing node, a storage node, and a graphic processing unit node.

There is also provided in accordance with still another embodiment of the present disclosure, a multi-host network interface card apparatus, including a network connector receptacle configured to provide connectivity with a packet communication network and to reversibly receive a first network connector plug terminating a network cable, a peripheral component bus connector receptacle configured to provide connectivity with a first network host and to reversibly receive a peripheral component bus connector plug terminating an external peripheral component bus cable, a peripheral component bus edge-connector configured to provide connectivity with a host processor of a second network host, and processing circuitry configured to set up and operate communication with the first network host over the external peripheral component bus cable and with the host processor of the second network host via the peripheral component bus edge-connector, and exchange network communication packets between the network hosts and the packet communication network.

There is also provided in accordance with still another embodiment of the present disclosure an external multi-host setup method, including inserting a first peripheral component bus connector plug of an external peripheral component bus cable into a first peripheral component bus connector receptacle of a first network host, which includes a first host processor, inserting a second peripheral component bus connector plug of the external peripheral component bus cable into a second peripheral component bus connector of a multi-host network interface card of a second network host, which includes a second host processor, inserting a first network connector plug terminating a network cable into a network connector receptacle of the multi-host network interface card, inserting a second network connector plug terminating the network cable into a network switch device providing connectivity with a packet communication network, wherein the multi-host network interface card includes a first peripheral component bus edge-connector configured to provide connectivity with the second host processor, and processing circuitry configured to set up and operate communication with the first network host over the external peripheral component bus cable and with the second host processor via the first peripheral component bus edge-connector, and exchange network communication packets between the network hosts and the packet communication network.

Additionally, in accordance with an embodiment of the present disclosure, the method includes disposing the first and second network hosts in a server enclosure, and connecting the multi-host interface card of the second network host and the first peripheral component bus connector receptacle of the first network host with the external peripheral component bus cable externally to the server enclosure.

Moreover in accordance with an embodiment of the present disclosure, the method includes disposing the first network host in a first server enclosure, disposing the second network host in a second server encloser, connecting the multi-host interface card of the second network host and the first peripheral component bus connector receptacle of the first network host with the external peripheral component bus cable externally to the first and second server enclosures.

Further in accordance with an embodiment of the present disclosure, the method includes inserting the first peripheral component bus edge-connector of the multi-host network interface card into a peripheral component bus slot of a motherboard, which includes the second host processor.

Still further in accordance with an embodiment of the present disclosure, the method includes inserting a second peripheral component bus edge-connector of an auxiliary card, which includes the first peripheral component bus connector receptacle, into a peripheral component bus slot of a motherboard, which includes the first host processor.

Additionally, in accordance with an embodiment of the present disclosure, the system includes mounting the first and second network hosts in a rack.

Moreover, in accordance with an embodiment of the present disclosure the first network host or the second network host includes any one or more of the following a computer processing node, a storage node, and a graphic processing unit node.

BRIEF DESCRIPTION OF THE DRAWINGS

The present invention will be understood from the following detailed description, taken in conjunction with the drawings in which.

DESCRIPTION OF EXAMPLE EMBODIMENTS

Overview

Figure 1:
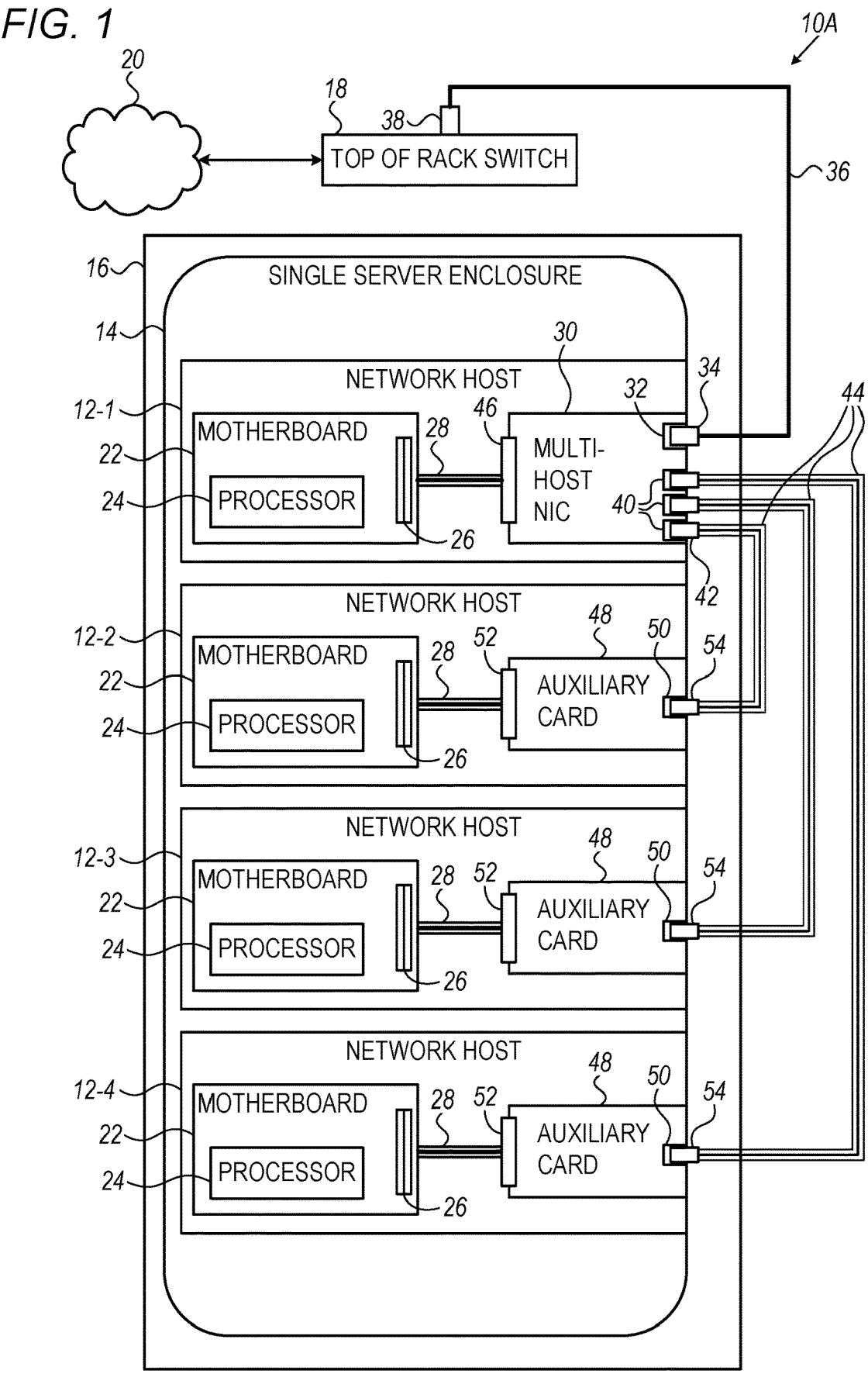
FIG. 1 is a schematic view of a multi-host system constructed and operative in accordance with an embodiment of the present invention.

Many modern servers are built in a constellation enclosure of a 2U box including four network hosts (e.g., computing nodes). These servers, and similar implementations, may be very dense requiring advanced thermal solutions that may be very complicated. Integrating yet another network interface card (NIC) into such a server enclosure is a challenge, especially when dealing with a high-performance, high-power NIC, which creates even more heat. Additionally, some NICs, especially high-performance, high-powered NICs, are expensive to produce.

Each NIC in the server enclosure generally has a network connection with a top of rack (TOR) switch. As the number of compute nodes increases so does the number of cables to the switch thereby complicating both installation and maintenance of the network connection. Additionally, each NIC requires a corresponding port in the TOR switch.

Embodiments of the present invention alleviate these difficulties by providing a multi-host NIC which is shared by at least two network hosts and exchanges network communication packets between the network hosts and a packet communication network.

The multi-host NIC is installed in a network host while auxiliary cards are installed in each of one or more other network hosts. In operation, the multi-host NIC is connected to the packet communication network via a network cable to a TOR switch. The multi-host NIC is connected to the auxiliary card of each of the other network hosts (or host) via a peripheral component bus (e.g., Pete) cable (e.g., a mini SAS HD cable), which has a plug that is inserted into a connector receptacle of the multi-host NIC and a plug that is inserted into a connector receptacle of the auxiliary card.

The multi-host NIC may serve any suitable number of network hosts using the above arrangement. In one example, the multi-host NIC may serve four network hosts in the sort of 2U box that is described above.

Sharing the multi-host NIC with multiple network hosts provides many advantages including reducing hardware and installation costs, reducing heat produced, reducing power consumption, reducing noise, reducing the number of cables from the hosts to the TOR switch, and reducing the number of ports needed in the TOR switch.

In some embodiments, the peripheral component bus cable is connected between the multi-host NIC and the auxiliary card externally to the server enclosure(s) housing the network hosts. This connection arrangement provides for greater flexibility than if the multi-host NIC and the auxiliary cards were connected within the server enclosures. The connection arrangement enables full independent serviceability of the network hosts as stand-alone units while benefiting from sharing the resources of the multi-host NIC. For example, if one of the network hosts needs to be removed for service or replaced, the relevant peripheral component bus cable may be unplugged while the network host is removed. The peripheral component bus cable may be reconnected after the same network host, or a new network host, is installed. If the network hosts are connected to the multi-host network card via an internal connection, removing and/or replacing network hosts is time consuming and technically challenging.

In most systems the use of network resources is not synchronized between the network hosts. However, as the multi-host NIC is used by multiple network hosts, the multi-host. NIC may be implemented with higher bandwidth capabilities, and thus each of the network hosts may utilize a higher burst of network bandwidth. Additionally, since only one TOR switch port is used by multiple network hosts, a dual-port NIC may be used, again enabling higher network bandwidth. A dual-port NIC may also be used to provide high-availability (HA) across two different switches (multi-chassis link aggregation (LAG)) or for boosting the bandwidth. In some embodiments, the aggregate bandwidth to any server is upper-limited by the PCIe bus bandwidth. For example, for four network nodes, the upper limit for PCIe Gen3 is 32 giga-transfers per second (GT/s).

System Description

Documents incorporated by reference herein are to be considered an integral part of the application except that, to the extent that any terms are defined in these incorporated documents in a manner that conflicts with definitions made explicitly or implicitly in the present specification, only the definitions in the present specification should be considered.

Reference is now made to FIG. 1, which is a schematic view of a multi-host system 10A constructed and operative in accordance with an embodiment of the present invention.

The multi-host system 10A includes multiple network hosts 12 which are individually labeled 12-1 to 12-4. The network hosts 12 may be selected from any suitable type of network host, for example, but not limited to, a computer processing node, a storage node, or a graphic processing unit node. The network hosts 12 may be the same type of network host or different types of network host.

The network hosts 12 are shown as being disposed one above the other in a column. The network hosts 12 may disposed in any suitable formation, for example, in a row, or in a formation of two rows by two columns in a 21J or other unit. The network hosts 12 are shown disposed in a single server enclosure 14 which is mounted in a rack 16. A top of rack network switch 18 is shown above the rack 16. The switch 18 may be disposed in a suitable location. The switch 18 is connected to a packet communication network 20.

Each of the network hosts 12 includes a motherboard 22 having a host processor 24 disposed thereon. The motherboard 22 may include a peripheral component bus slot 26 (e.g., a PCIe expansion slot) for accepting an edge-connector of another card, described in more detail below. The motherboard 22 may be connected to other cards in any suitable fashion via any suitable peripheral component bus link 28 (e.g., PCIe link).

The network host 12-1 includes a multi-host network interface card 30. The multi-host network interface card 30 includes a network connector receptacle 32 configured to provide connectivity with the packet communication network 20 and to reversibly receive a network connector plug 34 terminating a network cable 36 (e.g., an Ethernet® cable). FIG. 1 shows the network connector plug 34 inserted into the network connector receptacle 32 of the multi-host network interface card 30. The network cable 36 is terminated with another network connector plug 38 which is inserted into the switch 18.

The multi-host network interface card 30 also includes peripheral component bus connector receptacles 40, for example, PCIe connector receptacles. Each peripheral component bus connector receptacle 40 is configured to provide connectivity with one of the network hosts 12-2, 12-3, 12-4 and to reversibly receive a peripheral component bus connector plug 42 terminating an external peripheral component bus cable 44 (e.g., an external PCIe cable such as a mini SAS HD cable). It should be noted that PCIe is cited as one example of a bus standard and that any suitable bus standard may be used instead of PCIe. Only one peripheral component bus connector plug 42 has been labeled for the sake of simplicity. The cable is described as external because it is used to connect the network hosts 12 externally to the single server enclosure 14 as will be described in more detail below. The multi-host network interface card 30 also includes a peripheral component bus edge-connector 46, for example, a PCIe gold-finger edge-connector, configured to provide connectivity with the host processor 24 of the network host 12-1. The peripheral component bus slot 26 of the motherboard 22 of the network host 12-1 is configured to accept the peripheral component bus edge-connector 46 therein and provide connectivity with the peripheral component bus edge-connector 46 of the multi-host network interface card 30. FIG. 1 shows that the peripheral component bus edge-connector 46 and the peripheral component bus slot 26 are electromechanically connected via the peripheral component bus link 28, which typically includes inserting the peripheral component bus edge-connector 46 into the peripheral component bus slot 26. The multi-host network interface card 30 is described in more detail with reference to FIGS. 4 and 5 below.

It should be noted that all the host processors 24 are connected to the packet communication network 20 via the multi-host network interface card 30. The host processor 24 of the network host 12-1 is connected via the peripheral component bus edge-connector 46, whereas the host processors 24 of the network hosts 12-2, 12-3, 12-4 are connected via the respective external peripheral component bus cables 44 to the respective peripheral component bus connector receptacles 40.

Each of the network hosts 12-2, 12-3, 12-4 includes an auxiliary card 48 including a peripheral component bus connector receptacle 50 and a peripheral component bus edge-connector 52, for example, a PCIe gold-finger edge-connector. The peripheral component bus connector receptacle 50 is configured to reversibly receive a peripheral component bus connector plug 54 terminating one of the external peripheral component bus cables 44.

The peripheral component bus edge-connector 52 of each network host 12-2, 12-3, 12-4 is configured to provide connectivity with the peripheral component bus slot 26 of that network host. FIG. 1 shows that the peripheral component bus edge-connector 52 of each network host 12-2, 12-3, 12-4 is electromagnetically connected with the peripheral component bus slot 26 of that network host via the peripheral component bus link 28 which typically includes inserting the peripheral component bus edge-connector 52 into the peripheral component bus slot 26.

The auxiliary card 48 is described in more detail with reference to FIGS. 6 and 7.

As described above, each of the external peripheral component bus cables 44 is terminated with the peripheral component bus connector plug 42 and the peripheral component bus connector plug 54. The peripheral component bus connector plug 42 is inserted into one of the peripheral component bus connector receptacles 40 of the multi-host network interface card 30 and the peripheral component bus connector plug 54 is inserted into one of the peripheral component bus connector receptacles 50 of one of the auxiliary cards 48 so that the external peripheral component bus cables 44 connect the multi-host interface card 30 with the peripheral component bus connector receptacles 50 of the auxiliary cards 48 externally to the server enclosure 14. Therefore, the multi-host network interface card 30 and the peripheral component bus connector receptacles 50 are configured so that the external peripheral component bus cables 44 connect the multi-host interface card 30 of the network host 12-1 with the peripheral component bus connector receptacle 50 of the network hosts 12-2, 12-3, 12-4 externally to the server enclosure 14.

Figure 2:
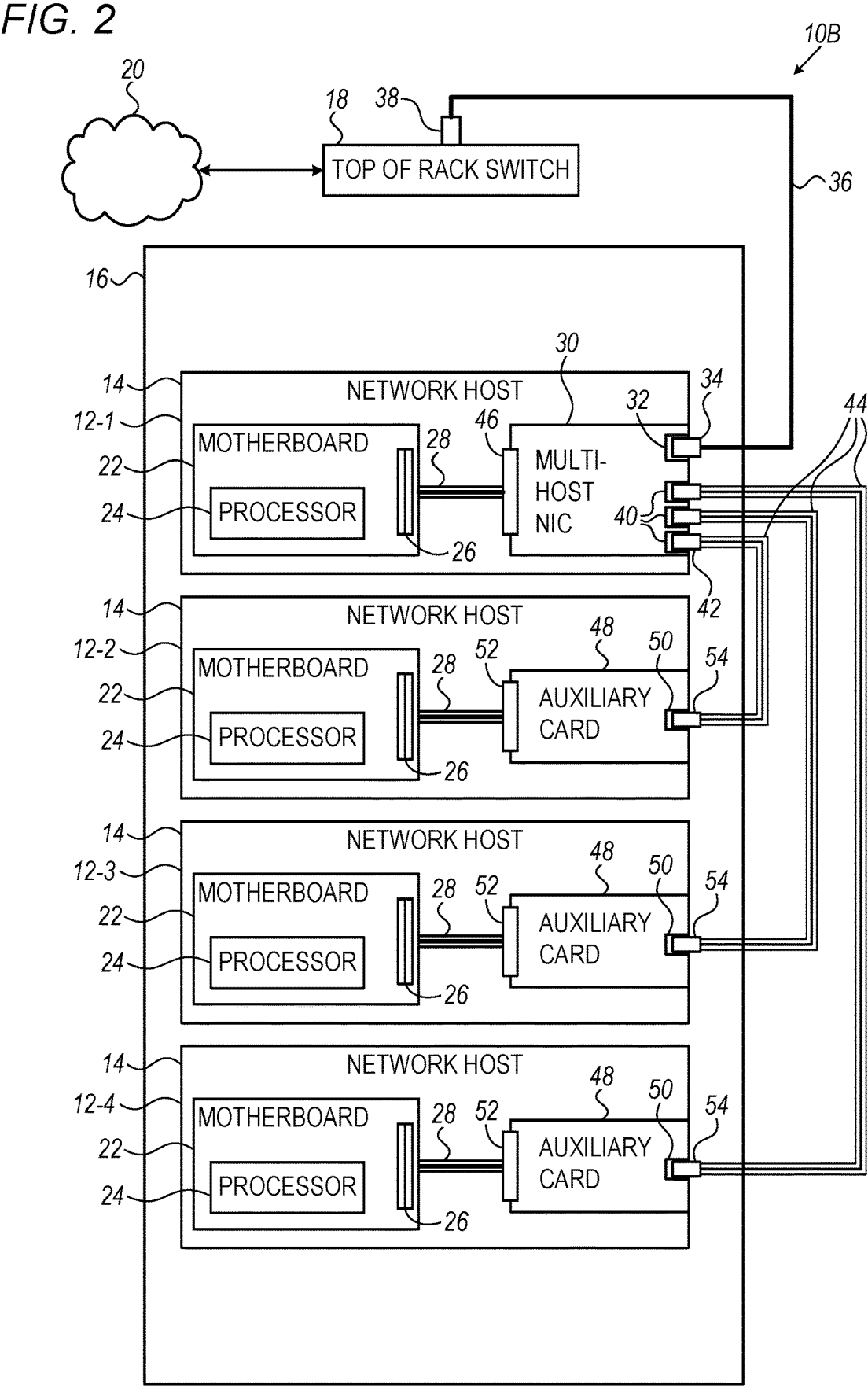
FIG. 2 is a schematic view of another multi-host system constructed and operative in accordance with a first alternative embodiment of the present invention.

Reference is now made to FIG. 2, which is a schematic view of another multi-host system 10B constructed and operative in accordance with a first alternative embodiment of the present invention.

The multi-host system 10B is substantially the same as the multi-host system 10A except that each of the network hosts 12 is enclosed in its own server enclosure 14. FIG. 2 illustrates that the multi-host network interface card 30 may serve network hosts 12 even in different server enclosures. For example, the multi-host network interface card 30 may be disposed in its own server enclosure 14 with none or one or more other network hosts 12 that connect via the external peripheral component bus cables 44 to the multi-host network interface card 30. Each of the other server enclosures 14 may include one or more network hosts 12 that are each connected via one of the external peripheral component bus cables 44 to the multi-host network interface card 30. To this end, the multi-host network interface card 30 may include any suitable number of peripheral component bus connector receptacles 40 for connection to the other network hosts 12.

The multi-host network interface card 30 and the respective peripheral component bus connector receptacles 50 of the respective auxiliary cards 48 are configured so that the respective external peripheral component bus cables 44 connect the multi-host interface card 30 of the network host 12-1 with the respective peripheral component bus connector receptacles 50 of the network hosts 12-2, 12-3, 12-4 externally to the server enclosures 14.

Figure 3:
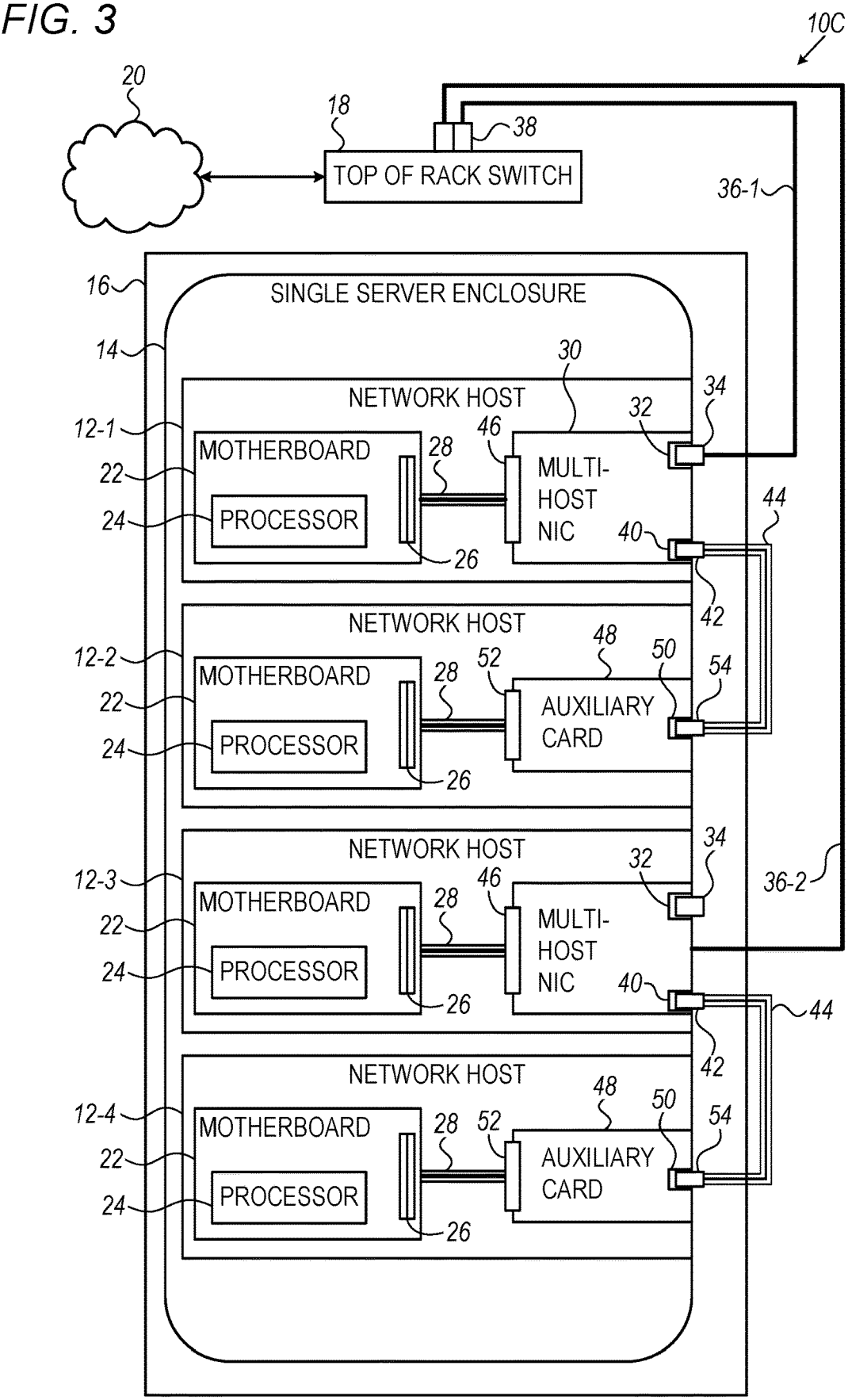
FIG. 3 is schematic view of yet another multi-host system constructed and operative in accordance with a second alternative embodiment of the present invention.

Reference is now made to FIG. 3, which is schematic view of yet another multi-host system 10C constructed and operative in accordance with a second alternative embodiment of the present invention.

FIG. 3 shows another configuration for connecting the network hosts 12. In the multi-host system 10C, each of the network hosts 12-1 and 12-3 includes the multi-host network interface card 30 and each of the network hosts 12-2, 12-4 includes the auxiliary card 48. The multi-host network interface card 30 of the network host 12-1 is connected to the switch 18 via a network cable 36-1, and to the auxiliary card 48 of the network host 12-2 via one of the external peripheral component bus cables 44. The multi-host network interface card 30 of the network host 12-3 is connected to the switch 18 via a network cable 36-2, and to the auxiliary card 48 of the network host 12-4 via one of the external peripheral component bus cables 44. Therefore, in this configuration two of the switch ports of the switch 18 are used by the four network hosts 12.

Figure 4:
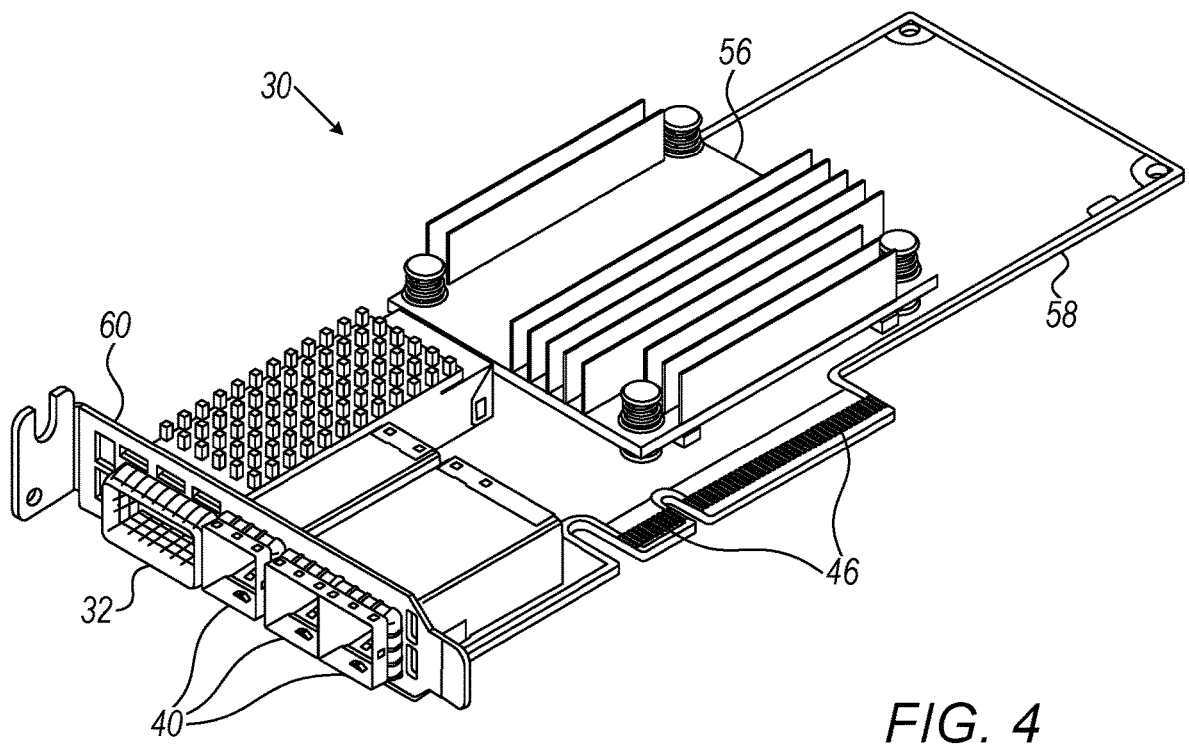
FIG. 4 is a schematic view of a multi-host network interface card constructed and operative in accordance with an embodiment of the present invention.

Reference is now made to FIG. 4, which is a schematic view of the multi-host network interface card 30 constructed and operative in accordance with an embodiment of the present invention. FIG. 4 shows the network connector receptacle 32, the peripheral component bus connector receptacles 40, and the peripheral component bus edge-connector 46. The multi-host network interface card 30 also includes processing circuitry 56 described in more detail with reference to FIG. 5. The network connector receptacle 32, the peripheral component bus connector receptacles 40, and the processing circuitry 56 are mounted on a circuit board 58 which includes various connections (not shown in FIG. 4) between the processing circuitry 56 and the other elements including the network connector receptacle 32, the peripheral component bus connector receptacles 40 and the peripheral component bus edge-connector 46. The multi-host network interface card 30 includes a faceplate 60 in which the openings of the network connector receptacle 32 and the openings of the peripheral component bus connector receptacles 40 are disposed so that when the multi-host network interface card 30 is installed in the network host 12-1 (FIG. 1), the network connector receptacle 32 and the peripheral component bus connector receptacles 40 face out of the server enclosure(s) 14 (FIG. 1) so that the external peripheral component bus cables 44 (FIG. 1) connects the multi-host network interface card 30 with the auxiliary cards 48 (FIG. 1) externally to the server enclosure(s) 14.

Figure 5:
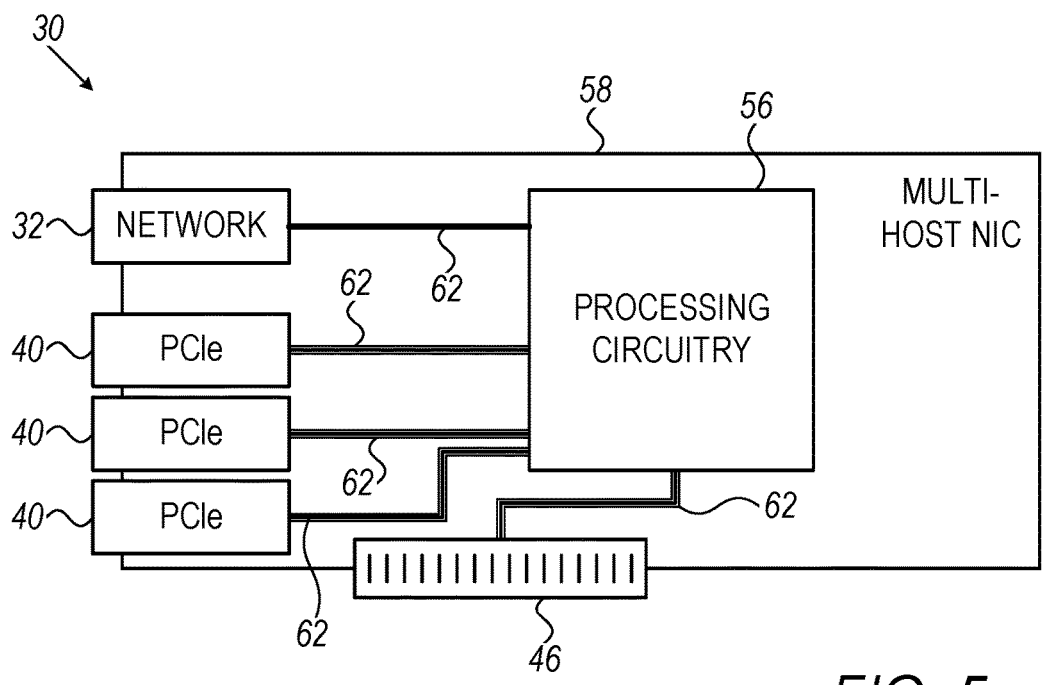
FIG. 5 is a block diagram view of the multi-host network interface card of FIG. 4.

Reference is now made to FIG. 5, which is a block diagram view of the multi-host network interface card 30 of FIG. 4, Reference is also made to FIG. 1.

FIG. 5 shows connections 62 disposed on the circuit board 58 between the processing circuitry 56 and the other elements including the network connector receptacle 32, the peripheral component bus connector receptacles 40 and the peripheral component bus edge-connector 46.

The processing circuitry 56 is configured to setup and operate communication with the host processor 24 of network hosts 12-2, 12-3, 12-4 over the external peripheral component bus cables 44 via the peripheral component bus connector receptacles 40 and with the host processor 24 of the network host 12-1 via the peripheral component bus edge-connector 46. The processing circuitry 56 is also configured to exchange network communication packets between the network hosts 12 and the packet communication network 20.

Certain elements of the processing circuitry 56 may be implemented using hardware, such as using one or more Application-Specific Integrated Circuits (ASICs) or Field-Programmable Gate Arrays (FPGAs). Alternatively, some elements of the processing circuitry 56 may be implemented in software or using a combination of hardware and software elements. In some embodiments, certain functions of the processing circuitry 56 may be implemented using a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

The PCIe protocol is by nature a point-to-point, host-to-device protocol, which does not support features such as point-to-multipoint operation or multi-host arbitration of any kind. Nevertheless, the multi-host network interface card 30 is configured to function as a single PCIe peripheral device that serves two or more PCIe hosts simultaneously. The multiple hosts are also referred to as root complexes.

Typically, the processing circuitry 56 sets-up and operates PCIe links with the network hosts 12, such that each host 12 is presented with an exclusive non-switched PCIe link to the multi-host network interface card 30 that is not shared with other hosts 12. Each host 12 is thus unaware of the existence of other hosts 12, i.e., the multi-host operation is transparent to the hosts 12. The resources of the multi-host network interface card 30 (processing resources; communication bandwidth) are allocated by the processing circuitry 56 to the various hosts 12 as appropriate. The processing circuitry 56 may perform such multi-host operation m various ways, and several example techniques are described below.

In an example embodiment, when setting up PCIe links, the processing circuitry 56 negotiates the link parameters (e.g., number of lanes, link speed or maximum payload size) independently with each host 12. The link parameters may generally comprise parameters such as various physical-layer (PHY), data-link layer and transaction-layer parameters. Since different hosts 12 may have different capabilities, the processing circuitry 56 attempts to optimize the parameters of each link without degrading one link because of limitations of a different host 12.

In some embodiments, however, after the link parameters are negotiated separately over each PCIe link, the processing circuitry 56 may actually use a global link configuration that is supported by all the hosts 12. Consider, for example, a group of four hosts 12 that configure the multi-host network interface card 30 for a maximum payload size of 128, 256, 512 and 1024 bytes, respectively. In this scenario, when actually generating payloads, the processing circuitry 56 may generate 128-byte payloads for all four links, so as to match the capabilities of all hosts 12 with a single global link configuration.

In some embodiments, the processing circuitry 56 presents the multi-host network interface card 30 to the hosts 12 separately, and thus receives separate and independent identifiers and configuration parameters from each host 12. For example, the processing circuitry 56 may receive a separate and independent Bus-Device-Function (BDF) identifier from each host 12. Each host 12 may typically enumerate the multi-host network interface card 30 separately, and set parameters such as PCIe Base Address Registers (BARs), other configuration header parameters, capabilities list parameters, MSIx table contents, separately and independently for each PCIe link. The processing circuitry 56 stores the separate identifiers and configuration parameters of the various links, and uses the appropriate identifier and configuration parameters on each link.

Typically, each PCIe link operates in accordance with a specified state machine or state model, which comprises multiple operational states and transition conditions between the states. The operational states may comprise, for example, various activity/inactivity states and/or various power-saving states.

In some embodiments, the processing circuitry 56 operates this state model independently on each PCIe link, i.e., vis-à-vis each host 12. In other words, the processing circuitry 56 carries out an independent communication session with each host 12. In these sessions, the processing circuitry 56 may transition a given PCIe link from one operational state to another at any desired time, independently of transitions in the other links. Thus, the state transitions in one link are not affected by the conditions or state of another link.

In some embodiments, the processing circuitry 56 operates separate and independent flow-control mechanisms vis-à-vis hosts 12 over the PCIe links. In an example embodiment, the processing circuitry 56 manages a separate set of credits for each PCIe link (e.g., Posted/NotPosted or Header/Data) with regard to credit consumption and release.

As yet another example, the processing circuitry 56 may operate separate and independent packet sequence numbering mechanisms vis-à-vis the hosts 12 over the PCIe links. The PCIe specification, for example, defines a data reliability mechanism that uses Transaction Layer Packet (TLP) sequence numbering. Thus, the processing circuitry 56 may use separate and independent TLP sequence numbers on each of the PCIe links.

The mechanisms described above are chosen purely for the sake of conceptual clarity. In alternative embodiments, the processing circuitry 56 may present and operate the multi-host network interface card 30 separately on each PCIe link in any other suitable way.

Figure 6:
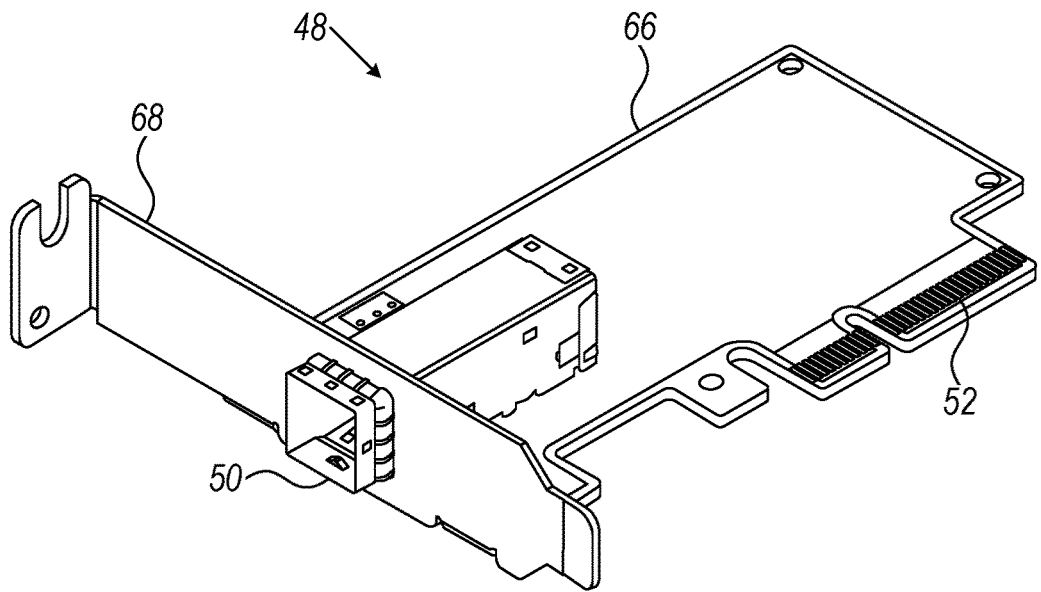
FIG. 6 is a schematic view of an auxiliary card constructed and operative in accordance with an embodiment of the present invention.

Reference is now made to FIG. 6, which is a schematic view of the auxiliary card 48 constructed and operative in accordance with an embodiment of the present invention. Reference is also made to FIG. 7, which is a block diagram view of the auxiliary card 48 of FIG. 6.

The auxiliary card 48 includes the peripheral component bus connector receptacle 50, the peripheral component bus edge-connector 52, and processing circuitry 64 (shown in FIG. 7) disposed on a circuit board 66.

Figure 7:
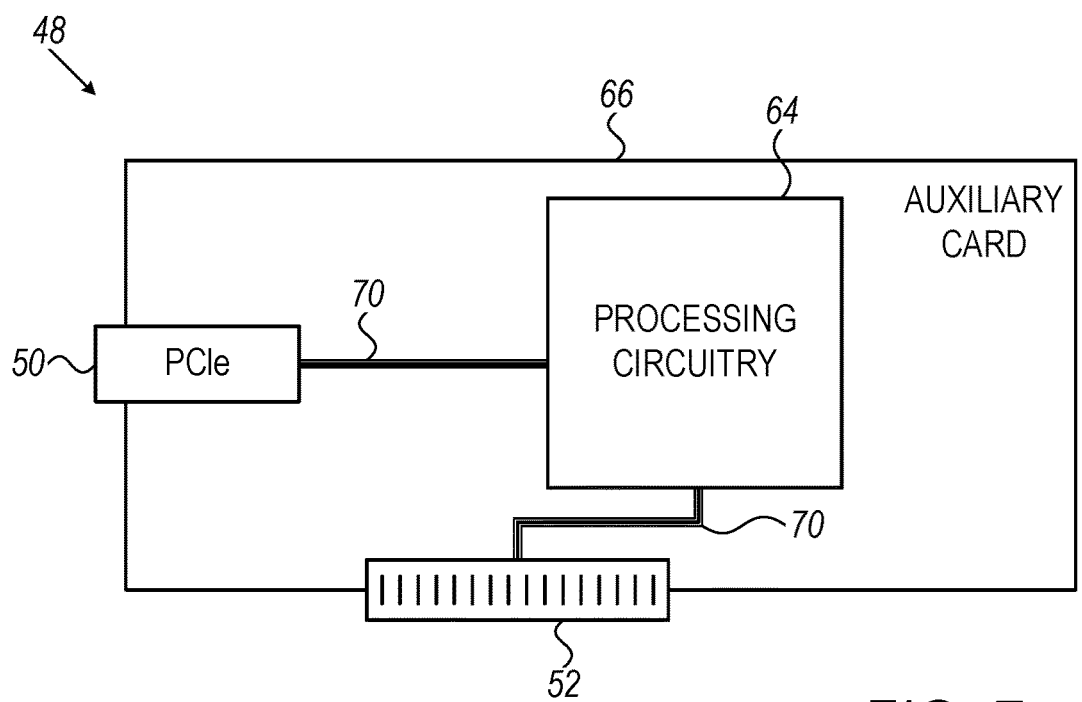
FIG. 7 is a block diagram view of the auxiliary card of FIG. 6.

The processing circuitry 64 is coupled to the peripheral component bus connector receptacle 50 and the peripheral component bus edge-connector 52 via connectors 70 (shown in FIG. 7). The processing circuitry 64 is configured to retime signals transferred between the peripheral component bus connector receptacle 50 and the peripheral component bus edge-connector 52 and to recondition the high-speed signal that gets degraded as it passes through the peripheral component bus connector plug 54 and the peripheral component bus connector receptacle 50 (e.g., HD-SAS connector interface) and also compensate for copper-loss in the external peripheral component bus cable 44. The functionality of the processing circuitry 64 may be performed by a custom-built or an off-the-shelf signal conditioner IC such as a Tx amplifier, e.g., DS80PCI402 produced by Texas Instruments.

The auxiliary card 48 includes a faceplate 68 in which the opening of the peripheral component bus connector receptacle 50 is disposed so that when the auxiliary card 48 is installed in one of the network hosts 12-2, 12-3, 12-4 (FIG. 1), the peripheral component bus connector receptacle 50 faces out of the server enclosure 14 (FIG. 1) so that the external peripheral component bus cable 44 (FIG. 1) inserted into the peripheral component bus connector receptacle 50 connects the auxiliary card 48 with the multi-host network interface card 30 (FIG. 1) externally to the server enclosure(s) 14.

Figure 8:
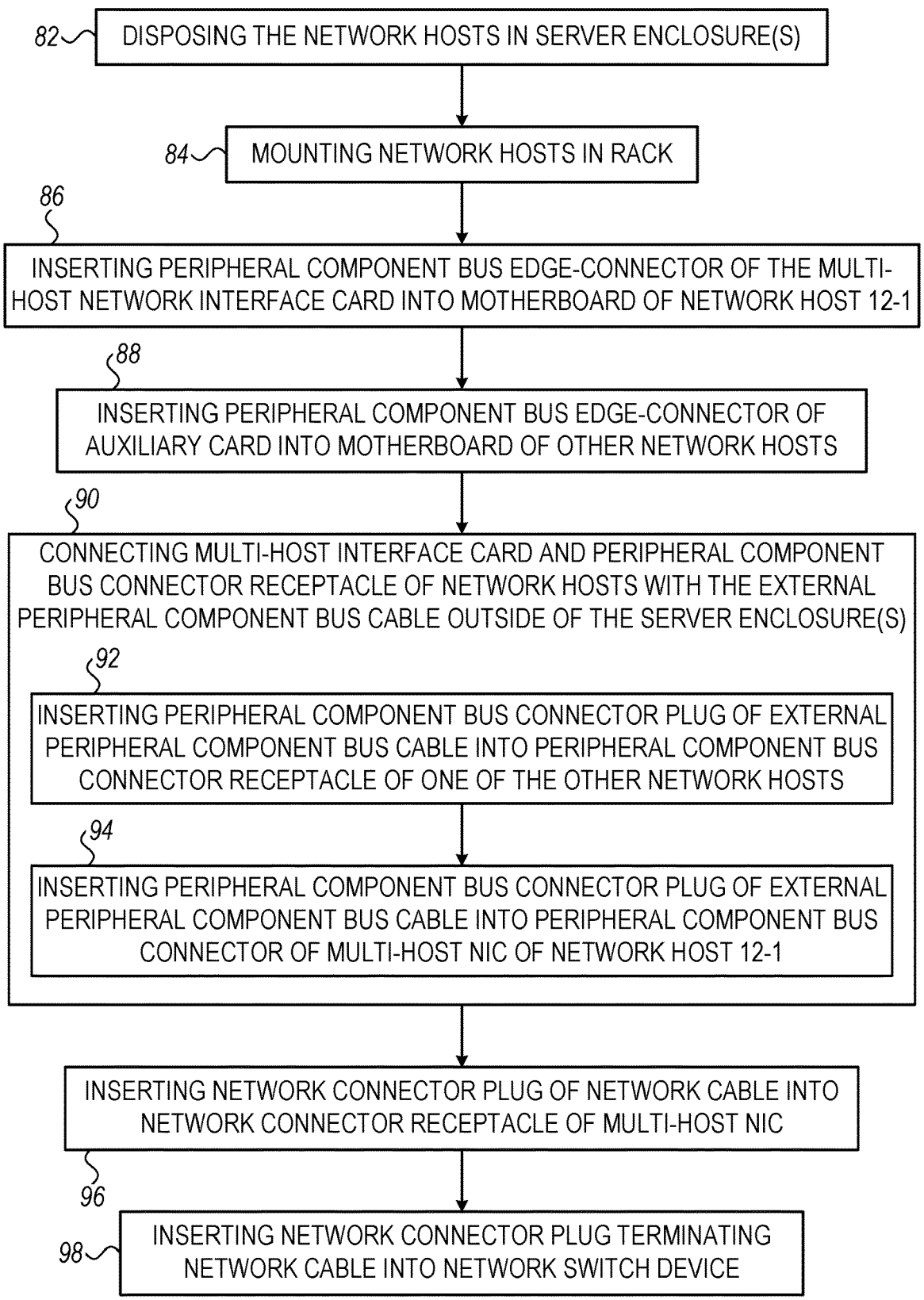
FIG. 8 is a flowchart including exemplary steps in an external multi-host setup method in accordance with an embodiment of the present invention.

Reference is now made to FIG. 8, which is a flowchart 80 including exemplary steps in an external multi-host setup method in accordance with an embodiment of the present invention. Reference is also made to FIG. 1.

The method includes disposing (block 82) the network hosts 12 in the single server enclosure 14. In some embodiments, the network hosts 12 are disposed in different server enclosures 14, for example, but not limited to, with one or more network hosts 12 per server enclosure 14. The method also includes mounting (block 84) the network hosts 12 (which are in the server enclosure(s) 14) in the rack 16.

The method includes inserting (block 86) the peripheral component bus edge-connector 46 of the multi-host network interface card 30 into the peripheral component bus slot 26 of the motherboard 22 of the network host 12-1. The method includes inserting (block 88), for each of the network hosts 12-2, 12-3, 12-4, the peripheral component bus edge-connector 52 of the auxiliary card 48 into the peripheral component bus slot 26 of the motherboard 22 of that network host 12. The step of blocks 86 and/or 88 may be performed before or after the steps of blocks 82 and/or 84.

The method also includes connecting (block 90) the multi-host network interface card 30 of the network host 12-1 to the peripheral component bus connector receptacle 50 of the auxiliary card 48 of one of the other network hosts 12-2, 12-3, 12-4 with the external peripheral component bus cable 44 externally to the single server enclosure 14 (or multiple server enclosures 14 according to the multi-host system 10B of FIG. 2).

The step of block 90 also include sub-steps of blocks 92 and 94. The sub-step of block 92 includes inserting the peripheral component bus connector plug 54 of the external peripheral component bus cable 44 into the peripheral component bus connector receptacle 50 of the auxiliary card 48 of one of the network hosts 12-2, 12-3, 12-4. The sub-step of block 94 includes inserting peripheral component bus connector plug 42 of the same external peripheral component bus cable 44 into one of the peripheral component bus connector receptacles 40 of the multi-host network interface card 30 of the network host 12-1.

The sub-steps of blocks 92 and 94 are repeated for connecting each of the network hosts 12-2, 12-3, 12-4 with the multi-host network interface card 30.

The method also includes inserting (block 96) the network connector plug 34 of the network cable 36 into the network connector receptacle 32 of the multi-host network interface card 30 and inserting (block 98) the network connector plug 38 terminating the network cable 36 into the network switch device 18 providing connectivity with the packet communication network 20.

Various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

The embodiments described above are cited by way of example, and the present invention is not limited by what has been particularly shown and described hereinabove. Rather the scope of the invention includes both combinations and subcombinations of the various features described hereinabove, as well as variations and modifications thereof which would occur to persons skilled in the art upon reading the foregoing description and which are not disclosed in the prior art.

What is claimed is:

1. An external multi-host system; comprising:
an external peripheral component bus cable terminated with a first peripheral component bus connector plug and a second peripheral component bus connector plug;
a first network host including a first host processor and a first peripheral component bus connector receptacle configured to reversibly receive the first peripheral component bus connector plug terminating the external peripheral component bus cable; and a second network host including a second host processor and a multi-host network interface card, which comprises:
- a network connector receptacle configured to provide connectivity with a packet communication network and to reversibly receive a first network connector plug terminating a network cable;
- a second peripheral component bus connector receptacle configured to provide connectivity with the first network host and to reversibly receive the second peripheral component bus connector plug terminating the external peripheral component bus cable;
- a first peripheral component bus edge-connector configured to provide connectivity with the second host processor; and
- processing circuitry configured to: set up and operate communication with the first network host over the external peripheral component bus cable and with the second host processor via the first peripheral component bus edge-connector; and exchange network communication packets between the network hosts and the packet communication network.

2. The system according to claim 1, further comprising a server enclosure enclosing the first and second network hosts, the multi-host network interface card and the first peripheral component bus connector receptacle being configured so that the external peripheral component bus cable connects the multi-host network interface card of the second network host with the first peripheral component bus connector receptacle of the first network host externally to the server enclosure.

3. The system according to claim 2, wherein the external peripheral component bus cable connects the multi-host network interface card of the second network host with the first peripheral component bus connector receptacle of the first network host externally to the server enclosure.

4. The system according to claim 1, further comprising: a first server enclosure enclosing the first network host; and a second server enclosure enclosing the second network host, the multi-host network interface card and the first peripheral component bus connector receptacle being configured so that the external peripheral component bus cable connects the multi-host network interface card of the second network host with the first peripheral component bus connector receptacle of the first network host externally to the first and second server enclosures.

5. The system according to claim 1, wherein the second network host comprises a motherboard including the second host processor and a peripheral component bus slot configured to provide connectivity with the first peripheral component bus edge-connector of the multi-host network interface card.

6. The system according to claim 5, wherein the first peripheral component bus edge-connector and the peripheral component bus slot are electromechanically connected.

7. The system according to claim 1, wherein the first network host further comprises:
- a motherboard comprising the first host processor and a peripheral component bus slot; and
- an auxiliary card comprising the first peripheral component bus connector receptacle and a second peripheral component bus edge-connector, which is configured to provide connectivity with the peripheral component bus slot.

8. The system according to claim 7, wherein the second peripheral component bus edge-connector and the peripheral component bus slot are electromechanically connected.

9. The system according to claim 7, wherein the auxiliary card comprises processing circuitry coupled to the first peripheral component bus connector receptacle and the second peripheral component bus edge-connector, the processing circuitry being configured to retime signals being transferred between the first peripheral component bus connector receptacle and the second peripheral component bus edge-connector.

10. The system according to claim 1, further comprising: a rack in which the first and second network hosts are mounted; a network switch device; and the network cable, wherein the first network connector plug terminating the network cable is inserted into the network connector receptacle of the multi-host network interface card, the network cable including a second network connector plug inserted into the network switch device.

11. The system according to claim 1, wherein the first network host or the second network host includes any one or more of the following: a computer processing node; a storage node; and a graphic processing unit node.

12. A multi-host network interface card apparatus, comprising:
- a network connector receptacle configured to provide connectivity with a packet communication network and to reversibly receive a first network connector plug terminating a network cable;
- a peripheral component bus connector receptacle configured to provide connectivity with a first network host and to reversibly receive a peripheral component bus connector plug terminating an external peripheral component bus cable;
- a peripheral component bus edge-connector configured to provide connectivity with a host processor of a second network host; and
- processing circuitry configured to: set up and operate communication with the first network host over the external peripheral component bus cable and with the host processor of the second network host via the peripheral component bus edge-connector; and exchange network communication packets between the network hosts and the packet communication network.

13. An external multi-host setup method, comprising:
- inserting a first peripheral component bus connector plug of an external peripheral component bus cable into a first peripheral component bus connector receptacle of a first network host, which includes a first host processor;
- inserting a second peripheral component bus connector plug of the external peripheral component bus cable into a second peripheral component bus connector of a multi-host network interface card of a second network host; which includes a second host processor;
- inserting a first network connector plug terminating a network cable into a network connector receptacle of the multi-host network interface card;
- inserting a second network connector plug terminating the network cable into a network switch device providing connectivity with a packet communication network, wherein the multi-host network interface card includes: a first peripheral component bus edge-connector configured to provide connectivity with the second host processor; and processing circuitry configured to: set up and operate communication with the first network host over the external peripheral component bus cable and with the second host processor via the first peripheral component bus edge-connector; and exchange network communication packets between the network hosts and the packet communication network.

14. The method according to claim 13, further comprising: disposing the first and second network hosts in a server enclosure; and connecting the multi-host network interface card of the second network host and the first peripheral component bus connector receptacle of the first network host with the external peripheral component bus cable externally to the server enclosure.

15. The method according to claim 13, further comprising: disposing the first network host in a first server enclosure; disposing the second network host in a second server enclosure; connecting the multi-host network interface card of the second network host and the first peripheral component bus connector receptacle of the first network host with the external peripheral component bus cable externally to the first and second server enclosures.

16. The method according to claim 13, further comprising inserting the first peripheral component bus edge-connector of the multi-host network interface card into a peripheral component bus slot of a motherboard, which comprises the second host processor.

17. The method according to claim 13, further comprising inserting a second peripheral component bus edge-connector of an auxiliary card, which comprises the first peripheral component bus connector receptacle, into a peripheral component bus slot of a motherboard, which comprises the first host processor.

18. The method according to claim 13, further comprising mounting the first and second network hosts in a rack.

19. The method according to claim 13, wherein the first network host or the second network host includes any one or more of the following: a computer processing node; a storage node; and a graphic processing unit node.

* * * * *